(12) United States Patent
Liang et al.

(10) Patent No.: US 9,261,910 B2
(45) Date of Patent: Feb. 16, 2016

(54) FIXING DEVICE FOR FIXING A PORTABLE ELECTRONIC DEVICE AND PORTABLE ELECTRONIC SYSTEM THEREWITH

(71) Applicant: Wistron Corporation, New Taipei (TW)

(72) Inventors: Chen-Yi Liang, New Taipei (TW); Hung-Chih Chen, New Taipei (TW); Cheng-Hsiang Chuang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 171 days.

(21) Appl. No.: 14/071,596

(22) Filed: Nov. 4, 2013

(65) Prior Publication Data

US 2014/0328019 A1  Nov. 6, 2014

(30) Foreign Application Priority Data

May 3, 2013 (TW) .............................. 102208296 U

(51) Int. Cl.
*G06F 1/16* (2006.01)

(52) U.S. Cl.
CPC ............. *G06F 1/1632* (2013.01); *Y10T 403/70* (2015.01); *Y10T 403/7007* (2015.01)

(58) Field of Classification Search
CPC ... G06F 1/1616; G06F 1/1656; G06F 1/1632; G06F 1/1679; G06F 1/1635; G06F 1/1626; G06F 2200/1632; G06F 2200/1633
See application file for complete search history.

(56) References Cited

U.S. PATENT DOCUMENTS

| | | | | |
|---|---|---|---|---|
| 6,829,140 B2 * | 12/2004 | Shimano et al. | ......... | 361/679.09 |
| RE39,429 E * | 12/2006 | Hawkins et al. | ............. | 708/100 |
| 7,184,263 B1 * | 2/2007 | Maskatia | ................ | 361/679.27 |
| 7,492,579 B2 | 2/2009 | Homer | | |
| 7,735,644 B2 * | 6/2010 | Sirichai et al. | ................ | 206/320 |
| 7,775,356 B2 * | 8/2010 | Palmer | ......................... | 206/320 |
| 8,312,991 B2 * | 11/2012 | Diebel et al. | ................ | 206/45.24 |
| 8,464,995 B2 * | 6/2013 | Yang et al. | ..................... | 248/455 |
| 8,467,184 B2 * | 6/2013 | Chen et al. | ............... | 361/679.55 |
| 8,467,186 B2 * | 6/2013 | Zeliff et al. | ............... | 361/679.56 |
| 8,717,319 B2 * | 5/2014 | Wu | ................ | 345/173 |
| 8,746,449 B2 * | 6/2014 | Gallagher et al. | ............. | 206/320 |
| 8,800,937 B1 * | 8/2014 | Lee et al. | ........................ | 248/65 |
| 8,844,892 B2 * | 9/2014 | Robinson | ..................... | 248/456 |
| 8,913,376 B2 * | 12/2014 | Wu et al. | ................. | 361/679.08 |
| 8,925,722 B2 * | 1/2015 | Poon et al. | .................... | 206/320 |
| 8,934,219 B2 * | 1/2015 | Gartrell et al. | ........... | 361/679.01 |
| D727,919 S * | 4/2015 | Melmon et al. | .............. | D14/440 |
| 2006/0187625 A1 * | 8/2006 | Jung et al. | ..................... | 361/681 |
| 2006/0192070 A1 * | 8/2006 | Chan | ........................... | 248/371 |
| 2007/0001079 A1 * | 1/2007 | Patterson, Jr. | .............. | 248/309.1 |
| 2007/0133156 A1 * | 6/2007 | Ligtenberg et al. | ........... | 361/681 |
| 2008/0302687 A1 * | 12/2008 | Sirichai et al. | ................ | 206/320 |
| 2009/0040701 A1 * | 2/2009 | Lin | ............................... | 361/681 |
| 2011/0180682 A1 * | 7/2011 | Tarnutzer et al. | ............. | 248/447 |
| 2011/0297566 A1 * | 12/2011 | Gallagher et al. | ............ | 206/320 |
| 2012/0044638 A1 * | 2/2012 | Mongan et al. | .......... | 361/679.55 |

(Continued)

*Primary Examiner* — Hoa C Nguyen
*Assistant Examiner* — Xanthia C Cunningham
(74) *Attorney, Agent, or Firm* — Winston Hsu; Scott Margo

(57) ABSTRACT

The present invention discloses a fixing device for fixing a portable electronic device. The fixing device includes a base and a plurality of fixing structures. A slot structure is formed on the base. The plurality of fixing structures is disposed on the base. The plurality of fixing structures is for fixing the portable electronic device on the base as an end of the portable electronic device is inserted into the slot structure.

10 Claims, 13 Drawing Sheets

(56) References Cited

U.S. PATENT DOCUMENTS

| | | | |
|---|---|---|---|
| 2012/0138766 A1* | 6/2012 | Chen | 248/456 |
| 2012/0293953 A1* | 11/2012 | Wu et al. | 361/679.56 |
| 2012/0307441 A1* | 12/2012 | Hung et al. | 361/679.09 |
| 2012/0327594 A1* | 12/2012 | Gengler | 361/679.56 |
| 2013/0016467 A1* | 1/2013 | Ku | 361/679.08 |
| 2013/0128453 A1* | 5/2013 | Lin | 361/679.56 |
| 2013/0134061 A1* | 5/2013 | Wu et al. | 206/320 |
| 2013/0170126 A1* | 7/2013 | Lee | 361/679.17 |
| 2013/0201625 A1* | 8/2013 | Liang et al. | 361/679.55 |
| 2013/0223005 A1* | 8/2013 | Smith et al. | 361/679.55 |
| 2014/0043743 A1* | 2/2014 | Liang | 361/679.09 |
| 2014/0071605 A1* | 3/2014 | Bates et al. | 361/679.09 |

\* cited by examiner

FIXING DEVICE FOR FIXING A PORTABLE ELECTRONIC DEVICE AND PORTABLE ELECTRONIC SYSTEM THEREWITH

BACKGROUND OF THE INVENTION

1. Field of the Invention

The present invention relates to a fixing device and a portable electronic system, and more especially, to a fixing device for fixing a portable electronic device and a portable electronic system therewith.

2. Description of the Prior Art

Portable electronic devices, such as tablet computers, are popular information technology products in the electronic products market presently. Tablet computers can be collocated with a base for supporting the tablet computer or providing a key-in function. For example, when it is desired to utilize the tablet computer in a notebook computer mode, the tablet computer can be inserted into the base with a keyboard. However, there is a single slot on the conventional base for connecting with the tablet computer so that the conventional tablet computer only can be utilized in a fixed angle. In addition, the tablet computer sways easily so that the tablet computer might be separated from the base to collide onto the floor or something else when the tablet computer is carried with the base because the tablet computer is fixed on the base only by the single slot. In consideration of it, it is a significant issue to design a fixing device for fixing a portable electronic device stably nowadays.

SUMMARY OF THE INVENTION

The present invention provides a fixing device for fixing a portable electronic device and a portable electronic system therewith, to solve the problems mentioned above.

According to the disclosure, the fixing device for fixing a portable electronic device includes a base and a plurality of fixing structures. At least one slot structure is formed on the base, and the plurality of fixing structures is disposed on the base. The plurality of fixing structures is to fix the portable electronic device on the base as an end of the portable electronic device is inserted into the at least one slot structure.

According to the disclosure, the plurality of fixing structures includes a rotary fixing unit for rotating against the end of the portable electronic device so as to fix the end of the portable electronic device inside the at least one slot structure.

According to the disclosure, the plurality of fixing structures includes a rib structure disposed on the at least one slot structure for inserting into the end of the portable electronic device so as to fix the portable electronic device with the rotary fixing unit.

According to the disclosure, the plurality of fixing structures includes a magnetic attraction component disposed on the base for attracting a magnetic component of the portable electronic device so as to fix the end of the portable electronic device inside the at least one slot structure.

According to the disclosure, a height of the rib structure is less then a height of the at least one slot structure so that the portable electronic device does not contact the rib structure as the portable electronic device is folded with the base.

According to the disclosure, a plurality of slot structure is formed on the base.

According to the disclosure, the rotary fixing unit includes a socket, a rotary plate and a resilient component. The socket is disposed on the base. The rotary plate is pivotally connected to the socket. The resilient component is connected to the socket and the rotary plate. The resilient component drives the rotary plate to rotate to a fixing position in a first rotating direction so that the rotary plate contacts against the end of the portable electronic device to fix the end of the portable electronic device inside the at least one slot structure as the portable electronic device is unfolded with respect to the base and inserted inside the at least one slot structure, and the portable electronic device drives the rotary plate to rotate to a position substantially parallel to the base in a second rotating direction opposite to the first rotating direction as the portable electronic device is folded with the base.

According to the disclosure, a fixing device for fixing the portable electronic device includes a base, a rotary fixing unit and a fixing structure. At least one slot structure is formed on the base. The rotary fixing unit rotates against an end of the portable electronic device. The fixing structure is disposed on the base, and the fixing structure is for fixing the portable electronic device on the base with the rotary fixing unit as the end of the portable electronic device is inserted into the at least one slot structure.

According to the disclosure, a portable electronic system includes a plate component, a portable electronic device and a fixing device. The plate component includes a first plate and a second plate, and the second plate is rotatably connected to the first plate so that the second plate can rotate relative to the first plate. The portable electronic device is connected to the second plate of the plate component. The fixing device is for fixing the portable electronic device on the first plate. The fixing device includes a base, a rotary fixing unit and a fixing structure. The base is disposed on the first plate of the plate component, and at least one slot structure is formed on the base. The rotary fixing unit for is rotating against an end of the portable electronic device. The fixing structure fixes the portable electronic device on the base with the rotary fixing unit as the end of the portable electronic device is inserted into the at least one slot structure.

The plurality of fixing structures of the fixing device can fix the portable electronic device on the base stably in the present invention. The plurality of fixing structures can optionally include a rotary fixing unit, a magnetic attraction component and a rib structure. The three kinds of fixing structures can be utilized in different combinations according to the practical requirements, thus the portable electronic device can be fixed on the base stably by the plurality of fixing structures. It can solve a conventional problem that the tablet computer sways easily so that the tablet computer might be separated from the base to collide onto the floor or something else when the tablet computer is carried with the base because the tablet computer is fixed on the base only by the single slot in the prior art. In addition, the plurality of the slot structures can be disposed on the base, and the portable electronic device can be selectively inserted into one of the slot structures so as to adjust a using angle and a view angle of the portable electronic device to be ergonomically.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
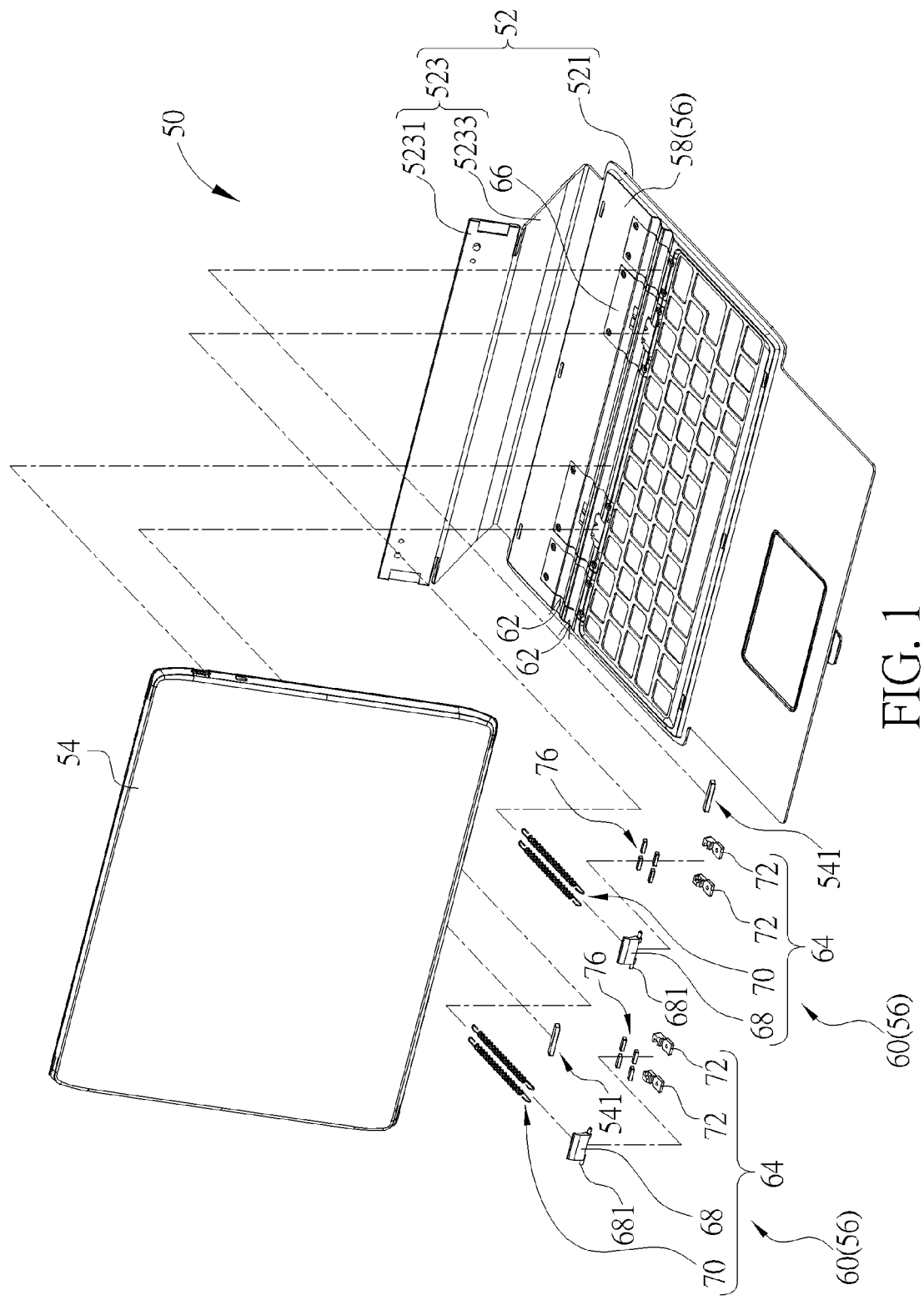
FIG. 1 is an exploded diagram of a portable electronic system according to an embodiment of the present invention.

Please refer to FIG. 1. FIG. 1 is an exploded diagram of a portable electronic system 50 according to an embodiment of the present invention. The portable electronic system 50 includes a plate component 52, a portable electronic device 54 and a fixing device 56. The plate component 52 includes a first plate 521 and a second plate 523. The second plate 523 is rotatably connected to the first plate 521. For example, the plate component 52 can be a sheath applicable to the portable electronic device 54. The first plate 521 and the second plate 523 can be integrally formed, and the second plate 523 can be flexibly connected to the first plate 521 for rotating relative to the first plate 521. The second plate 523 includes a fixing frame 5231 and a support wall 5233. The portable electronic device 54 is connected to the fixing frame 5231 of the second plate 523 of the plate component 52, and the support wall 5233 supports the portable electronic device 54 connected to the fixing frame 5231. The portable electronic device 54 can be a tablet computer. The tablet computer can be touched to input the required commands.

The fixing device 56 is for fixing the portable electronic device 54 on the first plate 521, and a keyboard component can be disposed on the first plate 521. Users can use the keyboard component on the first plate 521 to input commands as the fixing device 56 is fixing the portable electronic device 54 on the first plate 521. It means that the portable electronic system 50 can be used in a notebook computer mode. The fixing device 56 includes abase 58 and a plurality of fixing structures 60. The base 58 is disposed on the first plate 521 of the plate component 58, and at least one slot structure 62 is formed on the base 58. In this embodiment, two slot structures 62 are formed on the base 58. The plurality of fixing structures 60 is disposed on the base 56, and the plurality of fixing structures 60 is for fixing the portable electronic device 54 on the base 58 as an end of the portable electronic device 54 is inserted into the at least one slot structure 62. The plurality of fixing structures 60 includes at least one rotary fixing unit 64 for rotating against the end of the portable electronic device 54 so as to fix the end of the portable electronic device 54 inside the at least one slot structure 62. In this embodiment, the plurality of fixing structures 60 includes two rotary fixing units 64, but it is not limited to this embodiment.

Figure 2:
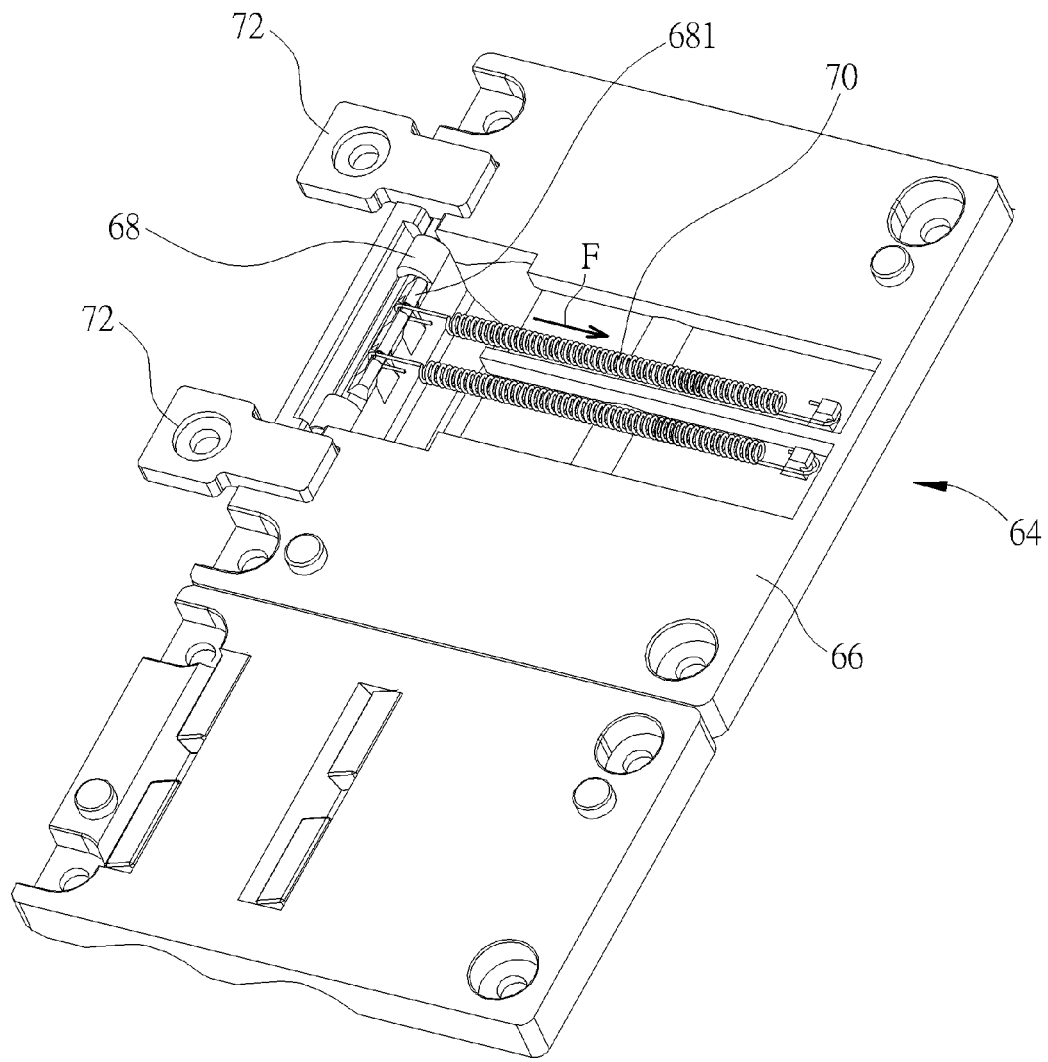
FIG. 2 is a diagram of a rotary fixing unit according to the embodiment of the present invention.
Figure 3:
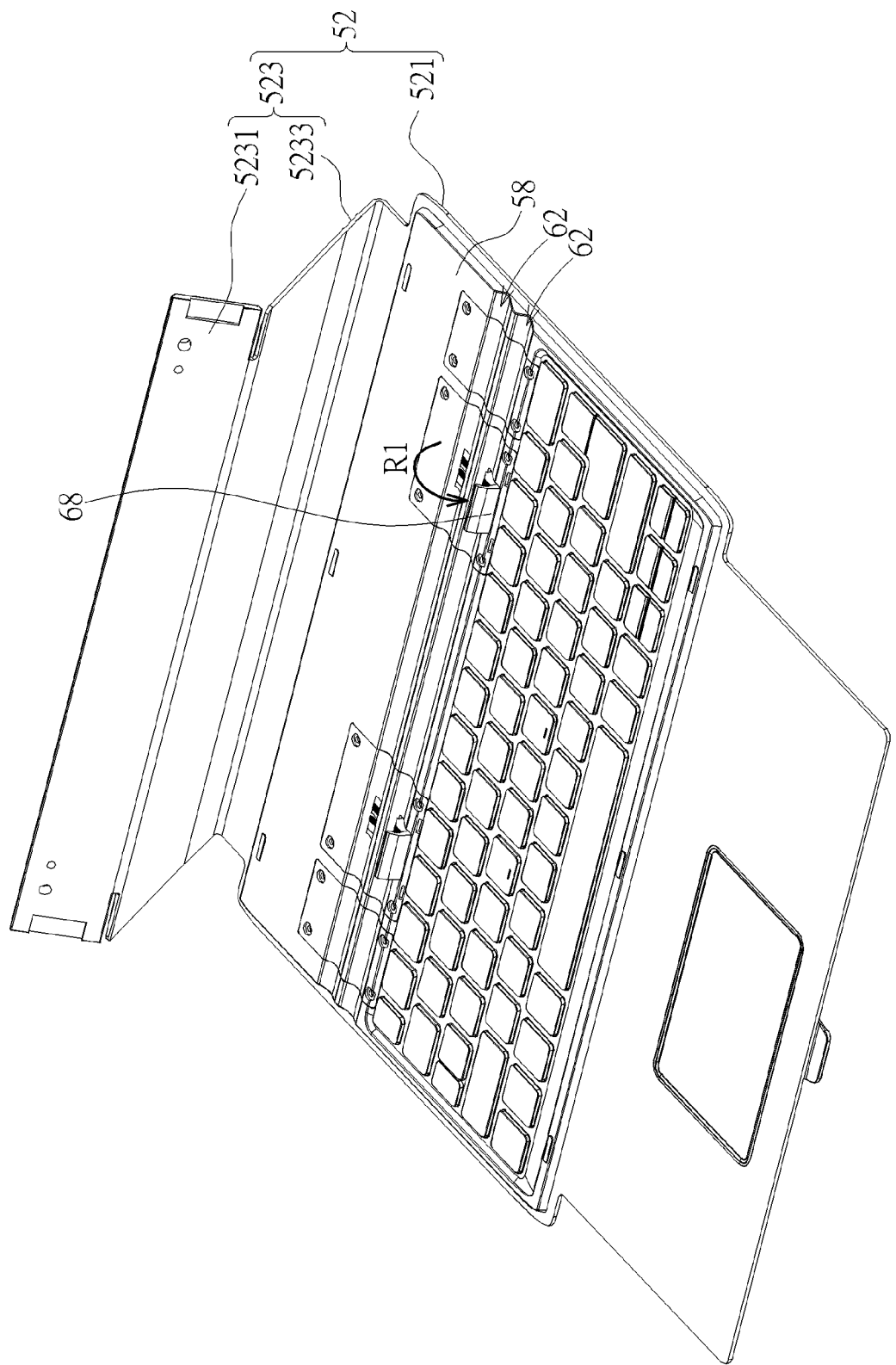
FIG. 3 is a diagram of the rotary fixing unit disposed on a base according to the embodiment of the present invention.
Figure 4:
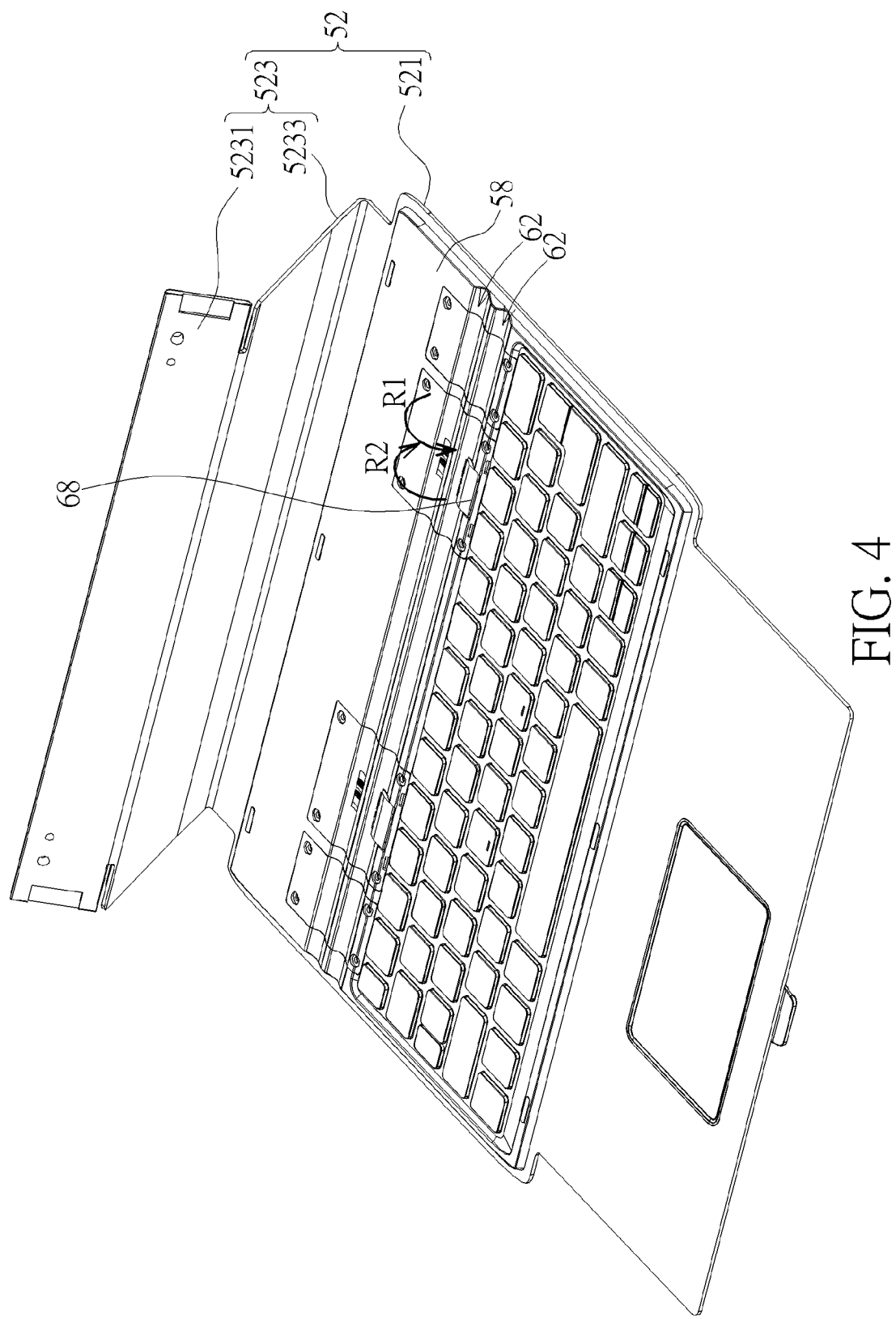
FIG. 4 is a diagram of the rotary fixing unit disposed on the base in another status according to the embodiment of the present invention.
Figure 5:
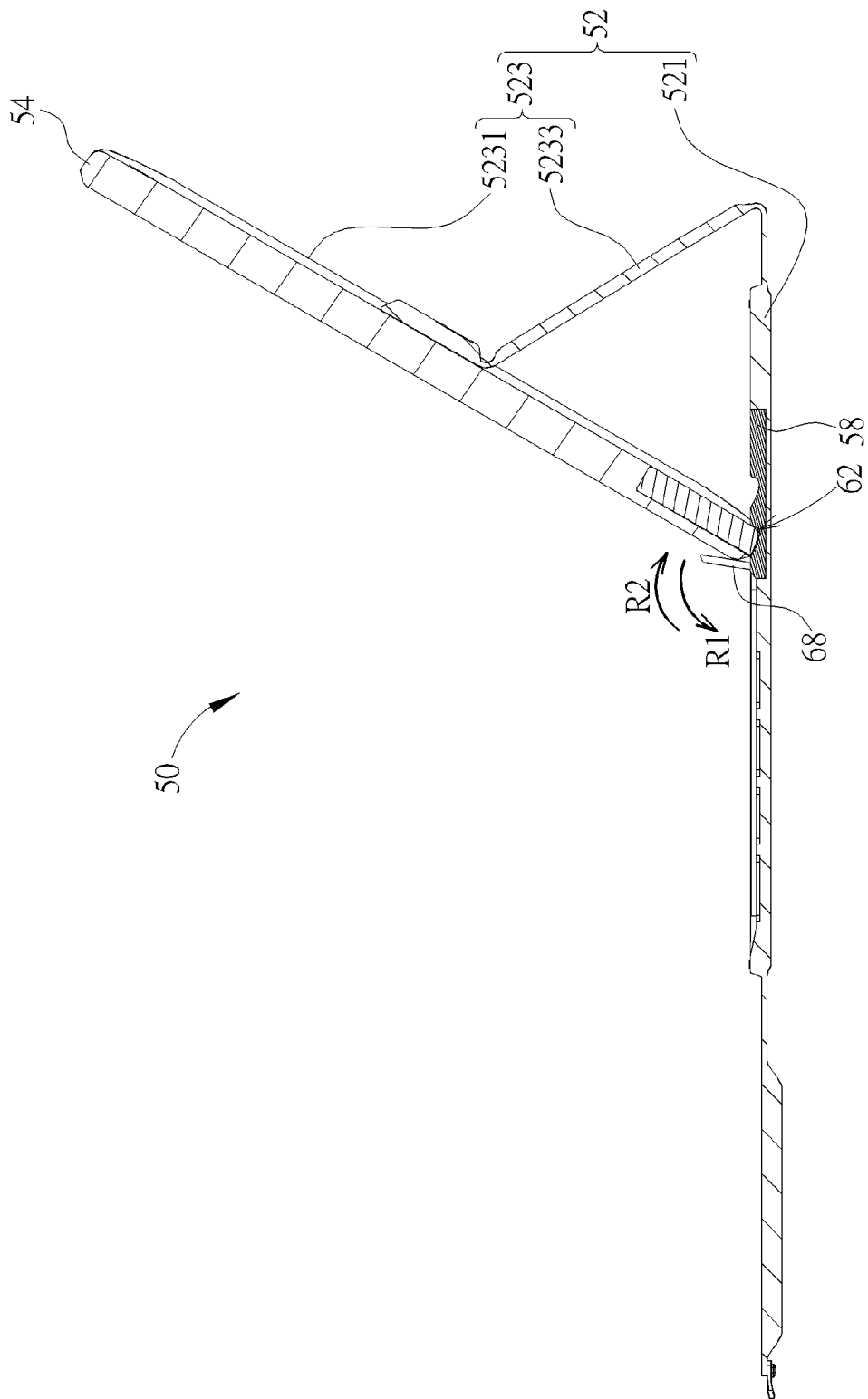
FIG. 5 is a lateral view of the rotary fixing unit disposed on the base according to the embodiment of the present invention.
Figure 6:
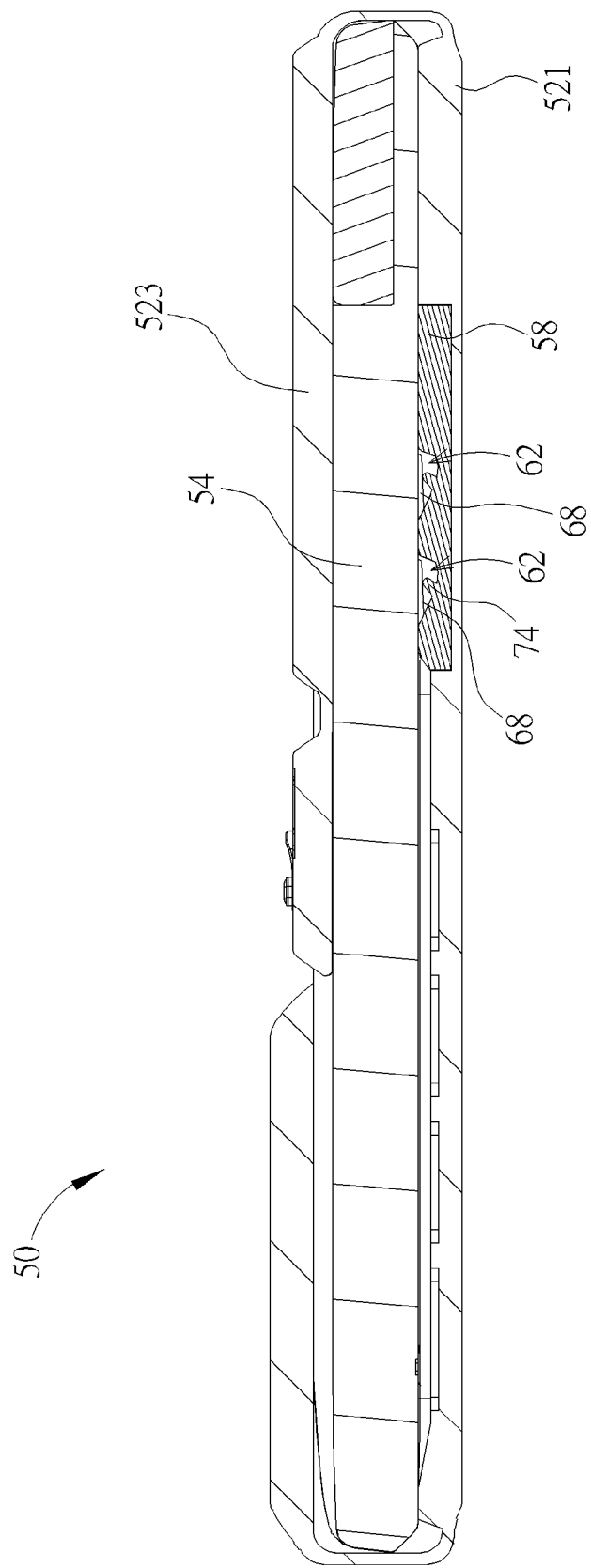
FIG. 6 is a lateral view of a portable electronic device folded with the base according to the embodiment of the present invention.
Figure 7:
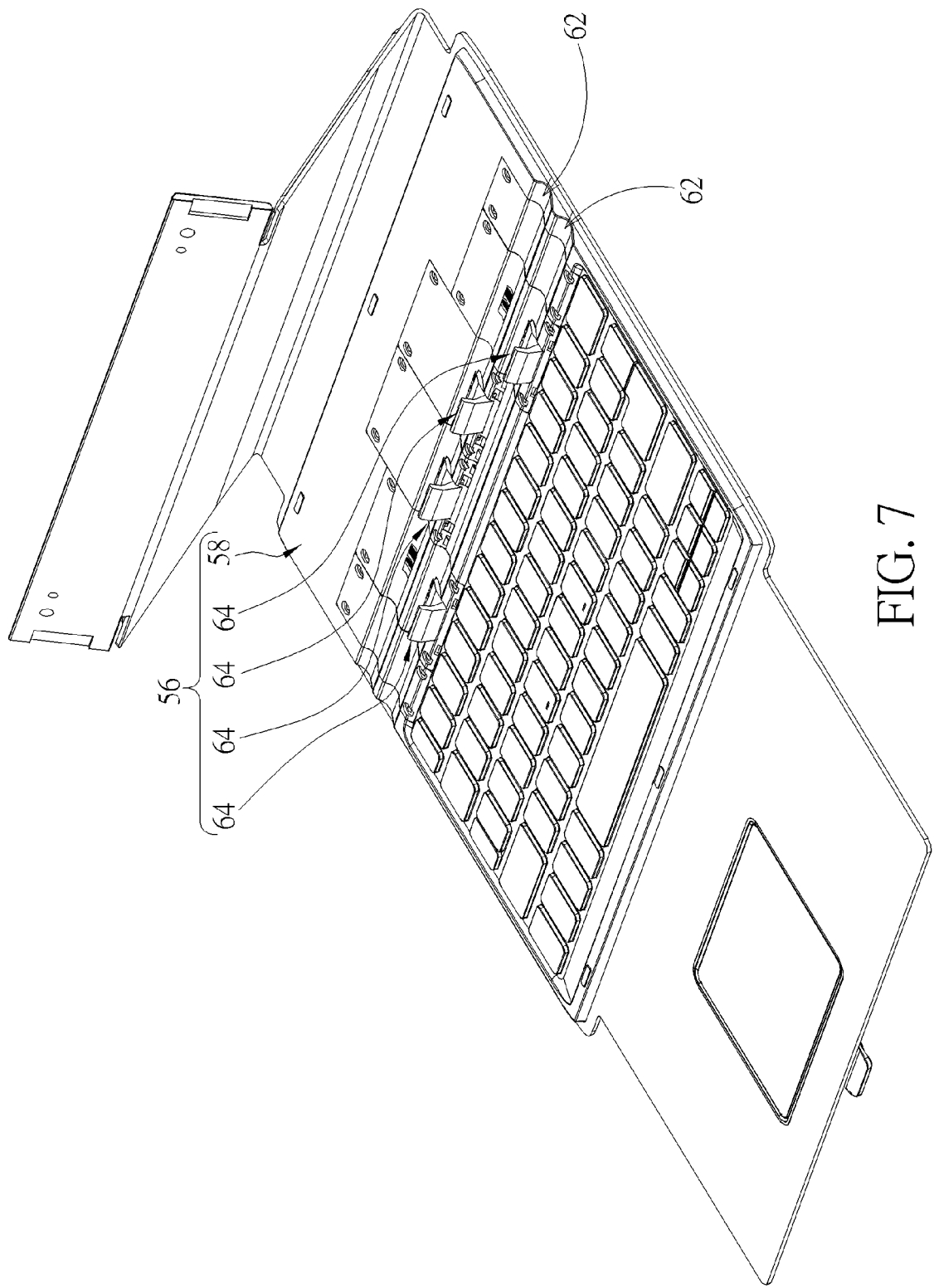
FIG. 7 is a diagram of a fixing device according to another embodiment of the present invention.

Please refer to FIG. 1 to FIG. 6. FIG. 2 is a diagram of the rotary fixing unit 64 according to the embodiment of the present invention. FIG. 3 is a diagram of the rotary fixing unit 64 disposed on the base 58 according to the embodiment of the present invention. FIG. 4 is a diagram of the rotary fixing unit 64 disposed on the base 58 in another status according to the embodiment of the present invention. FIG. 5 is a lateral view of the rotary fixing unit 64 disposed on the base 58 according to the embodiment of the present invention. FIG. 6 is a lateral view of the portable electronic device 54 folded with the base 58 according to the embodiment of the present invention. The rotary fixing unit 64 includes a socket 66, a rotary plate 68 and at least one resilient component 70. In this embodiment, each of the rotary fixing unit 64 includes two resilient components 70, as shown in FIG. 1 and FIG. 2. The socket 66 can be disposed on the base 58, the rotary plate 68 is pivoted to the socket 66, and the two ends of the two resilient components 70 are connected to the socket 66 and the rotary plate 68 respectively. In addition, each of the rotary fixing unit 64 further includes two covering components 72 to cover a pivot 681 of the rotary plate 68 as the rotary plate 68 is disposed on the socket 66. The two cover components 72 can avoid the rotary plate 68 from separating from the socket 66. In another embodiment, the rotary plate 68 can be also pivotally connected to the base 58 directly, and two ends of the resilient component 70 are directly connected to the base 58 and the rotary plate 68 respectively. It means that the socket 66 can be disposed optionally and not necessarily. As for the action of the rotary fixing unit 64, as shown in FIG. 2, FIG. 3 and FIG. 5, the two resilient components 70 can drive the rotary plate 68 to rotate to a fixing position in a first rotating direction R1 as the portable electronic device 54 is unfolded with respect to the base 58 and inserted inside the at least one slot structure 62. The rotary plate 68 contacts against the end of the portable electronic device 54 to fix the end of the portable electronic device 54 inside the at least one slot structure 62 as the rotary plate 68 rotates to the fixing position. Please refer to FIG. 4 to FIG. 6, the portable electronic device 54 presses the rotary plate 68 to a position substantially parallel to the base 58 in a second rotating direction R2 opposite to the first rotating direction R1 as the portable electronic device 54 is folded with the base 58, as shown in FIG. 6. As shown in FIG. 4, thus the portable electronic device 54 can be contained in the plate component 52. However, the two resilient components 70 provide a resilient recovering force to the rotary plate 68 for driving the rotary plate 68 to the fixing position in the first rotating direction R1 as the portable electronic device 54 is separated from and unfolded with respect to the base 58 from the folded status, as shown in FIG. 3. In addition, please refer to FIG. 7. FIG. 7 is a diagram of the fixing device 56 according to another embodiment of the present invention. In this embodiment, two slot structures 62 and four rotary fixing units 64 are formed on the base 58, the portable electronic device 54 shown in FIG. 1 can be selectively disposed in one of the two slot structures 62 for the purpose of using the portable electronic device 54 in different angles. The number and the position of the slot structures 62 and the rotary fixing units 64 are not limited to the embodiment mentioned above. It depends on the practical requirements.

Figure 8:
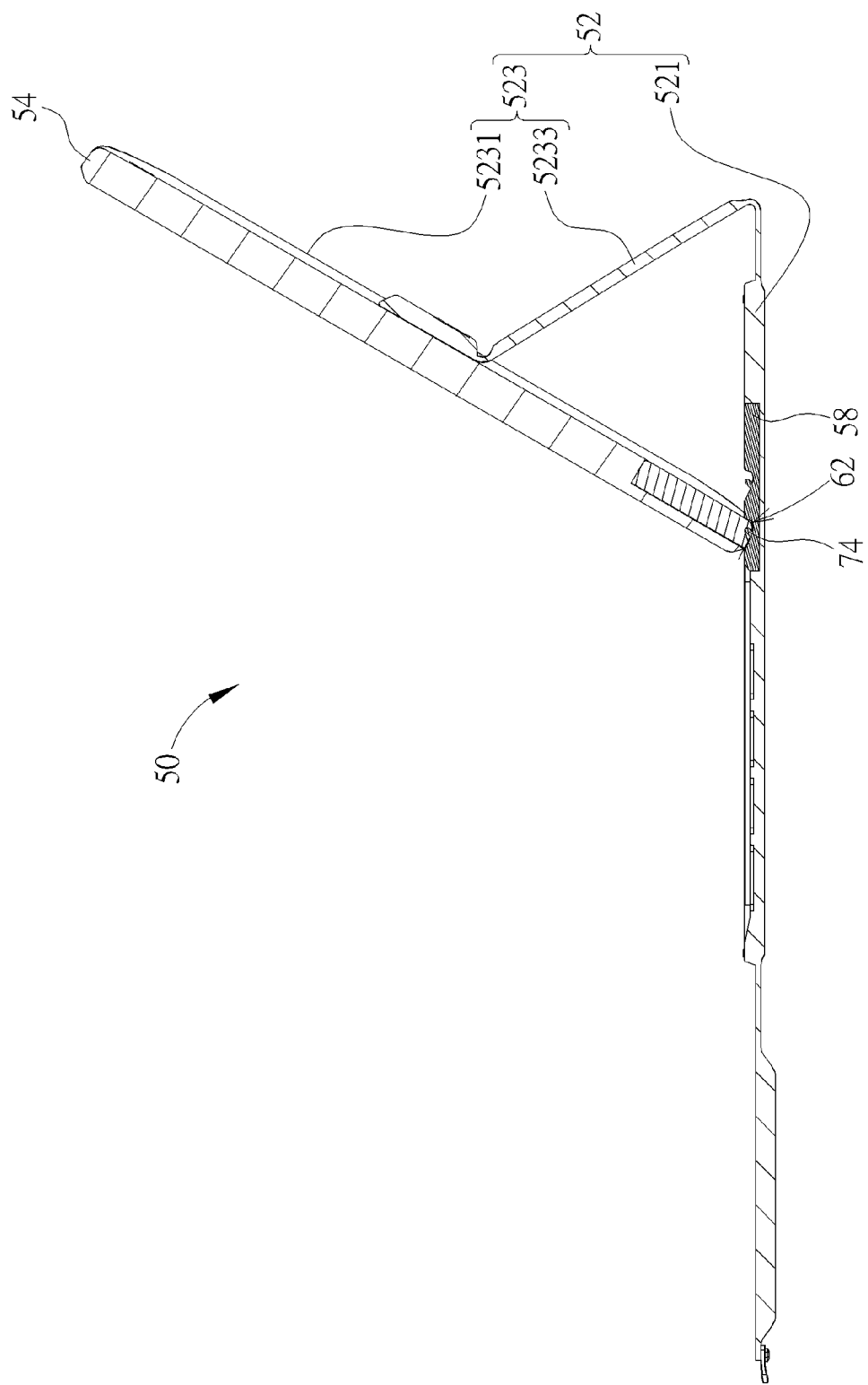
FIG. 8 to FIG. 13 are diagrams illustrating fixing structures fixing the portable electronic device on the base according to different embodiments of the present invention.
Figure 9:
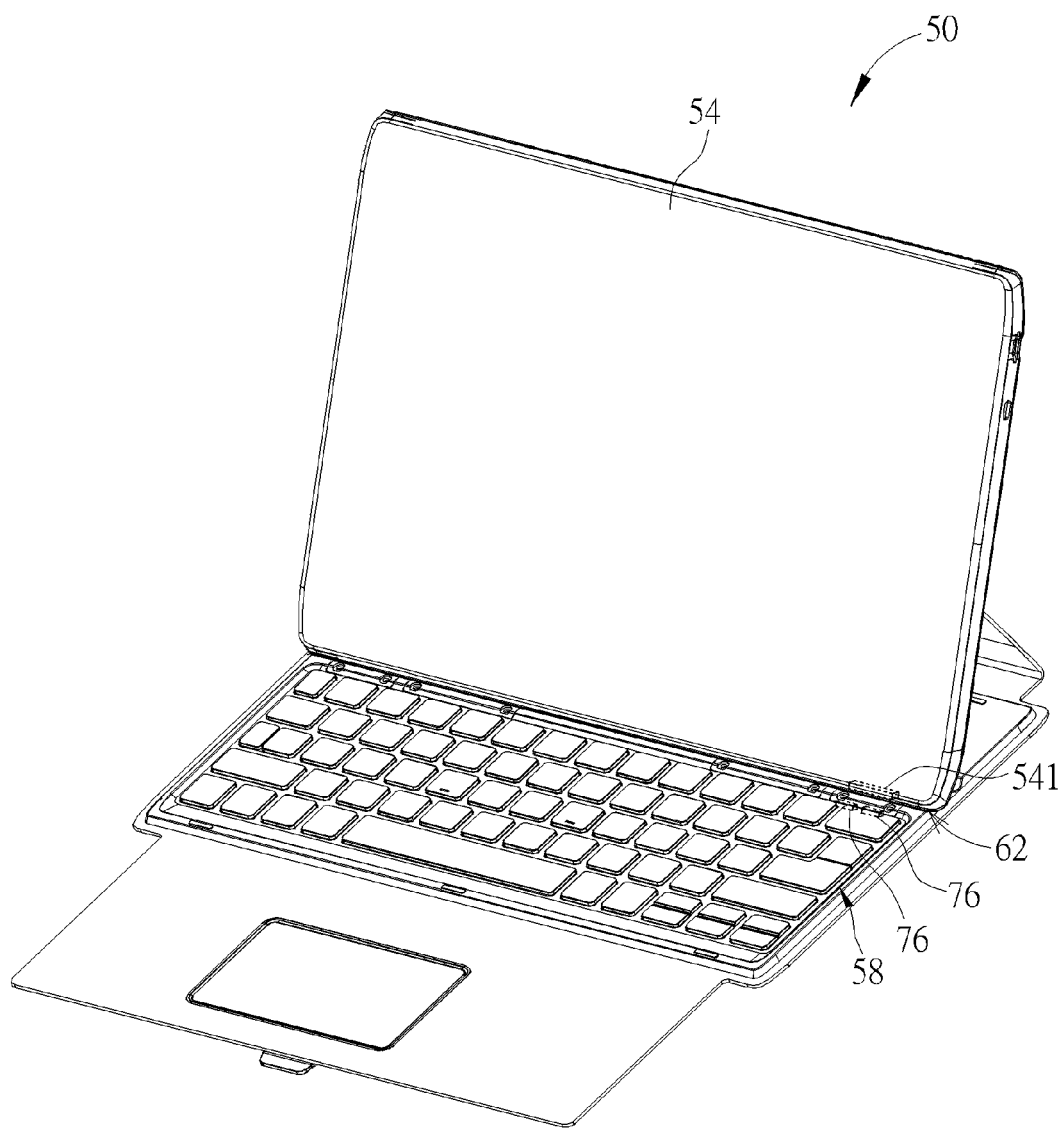

Please refer to FIG. 8 to FIG. 13. FIG. 8 to FIG. 13 are diagrams illustrating the fixing structures fixing the portable electronic device 54 on the base 58 according to different embodiments of the present invention. As shown in FIG. 8, each of the fixing structures can be a rib structure 74 and is disposed on the at least one slot structure 62. The rib structure 74 is inserted into the end of the portable electronic device 54 for fixing the end of the portable electronic device 54 inside the at least one slot structure 62 as the end of the portable electronic device 54 is inserted into the at least one slot structure 62. In addition, as shown in FIG. 9, the plurality of fixing structures can be two magnetic attraction components 76 disposed on the base 58. The magnetic attraction components 76 attract a magnetic component 541 of the portable electronic device 54 for fixing the end of the portable electronic device 54 inside the at least one slot structure 62 as the end of the portable electronic device 54 is inserted into the at least one slot structure 62. The number and the position of the magnetic attraction component 76 and the magnetic component 541 are not limited to this embodiment. It depends on the practical requirements. For example, four magnetic attraction components 76 can be disposed on the base 58, and two magnetic components 541 can be disposed on two sides of the end of the portable electronic device 54 corresponding to the two magnetic attraction components 76. The magnetic attraction components 76 also can be disposed on the end of the portable electronic device 54, and two corresponding magnetic components 541 are disposed on the base 58 accordingly. The mechanism for fixing the portable electronic device 54 inside the at least one slot structure 62 by magnetic components is within the scope of the present invention.

Figure 10:
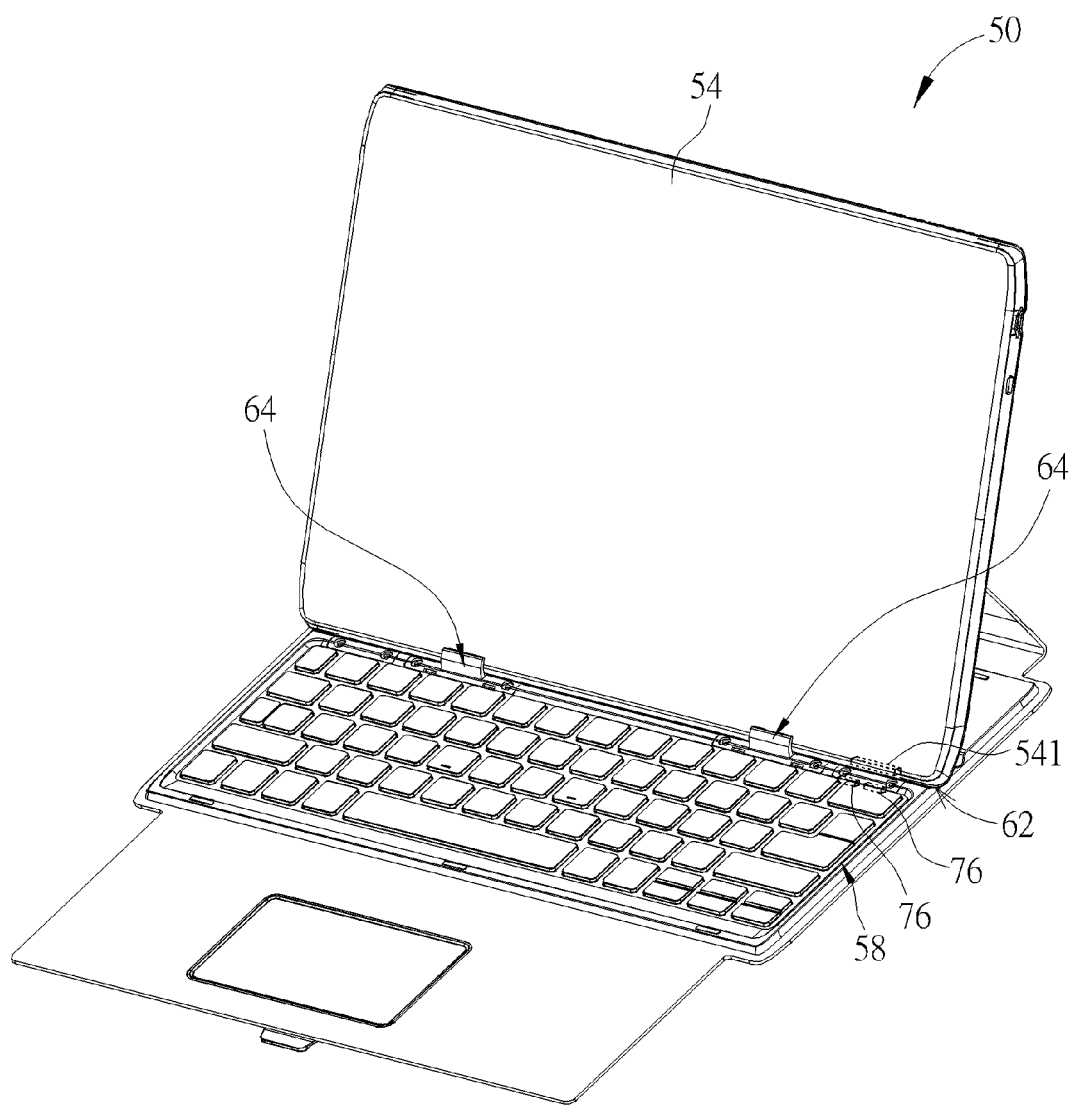

In addition, as shown in FIG. 10, the portable electronic system 50 can include different kinds of fixing structures in this embodiment. For example, the plurality of fixing structures can include two magnetic attraction components 76 and two rotary fixing units 64. The two magnetic attraction components 76 attract the corresponding magnetic component 541 of the portable electronic device 54 so as to fix the portable electronic device 54 with the rotary fixing units 64. The number and the position of the magnetic attraction components 76, the rotary fixing units 64 and the magnetic components 541 are not limited to this embodiment. It depends on the practical requirements. For example, two rotary fixing units 64, four magnetic attraction components 76 and two corresponding magnetic components 541 can be disposed on two sides of the end of the portable electronic device 54.

Figure 11:
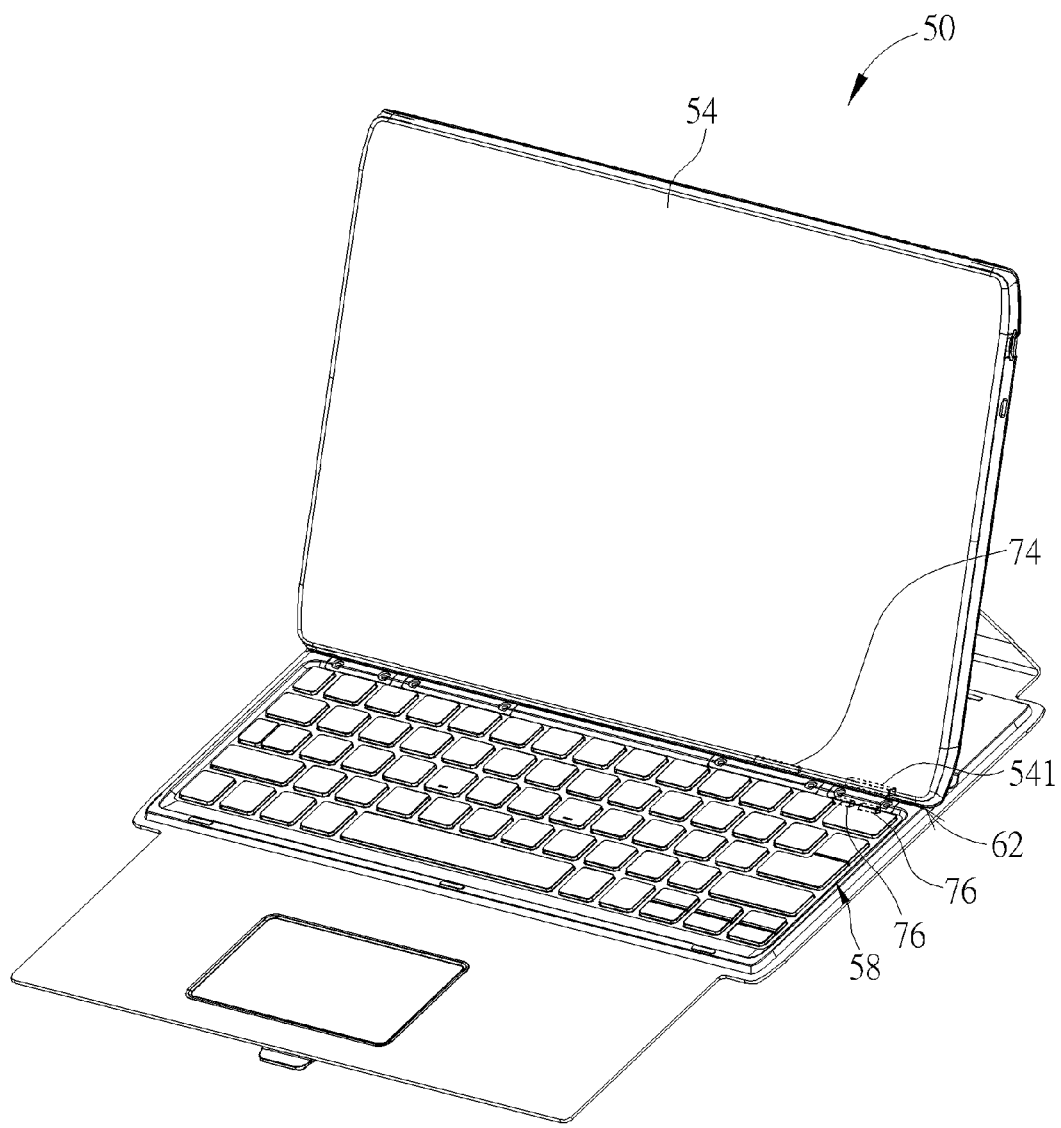
Figure 12:
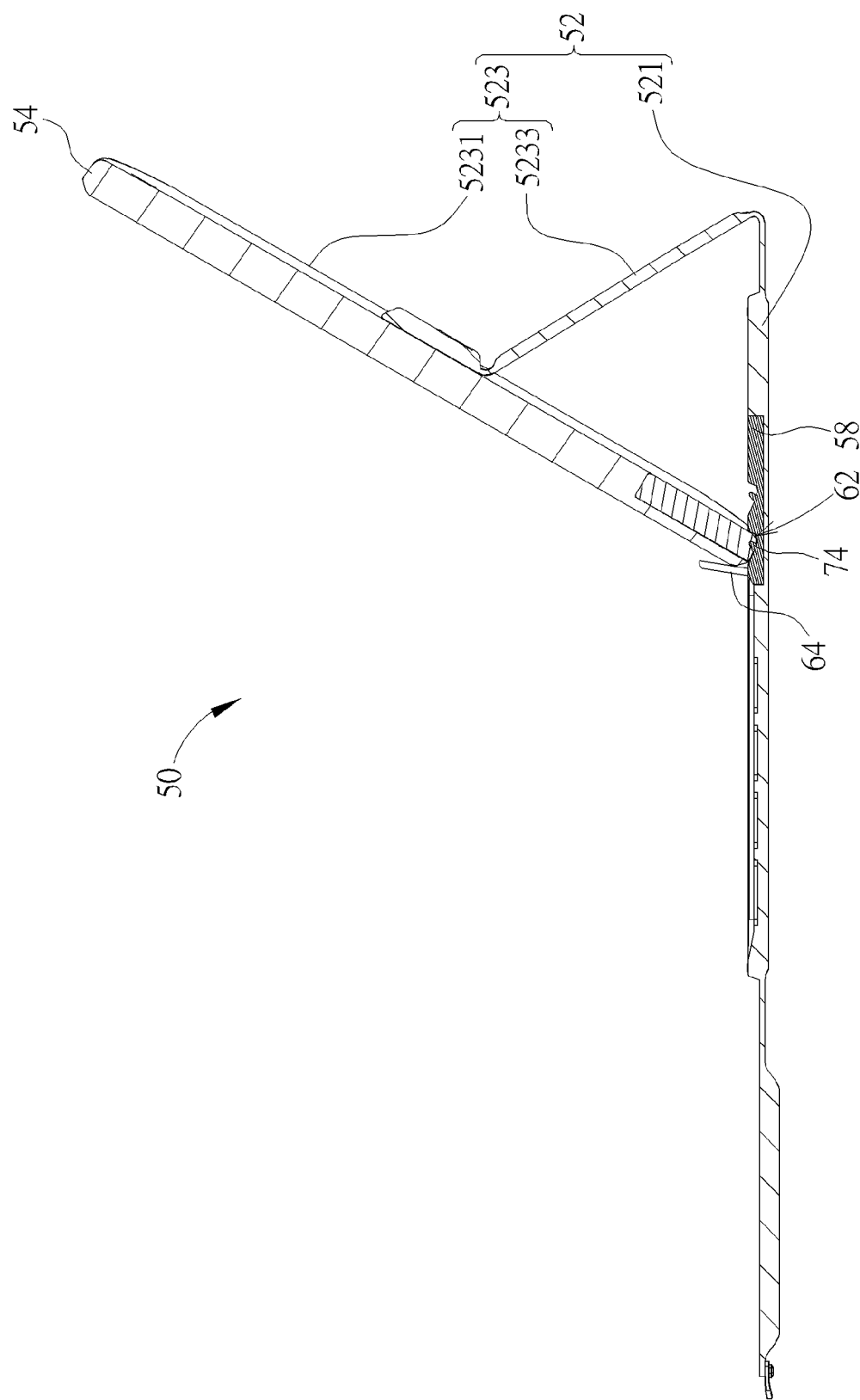
Figure 13:
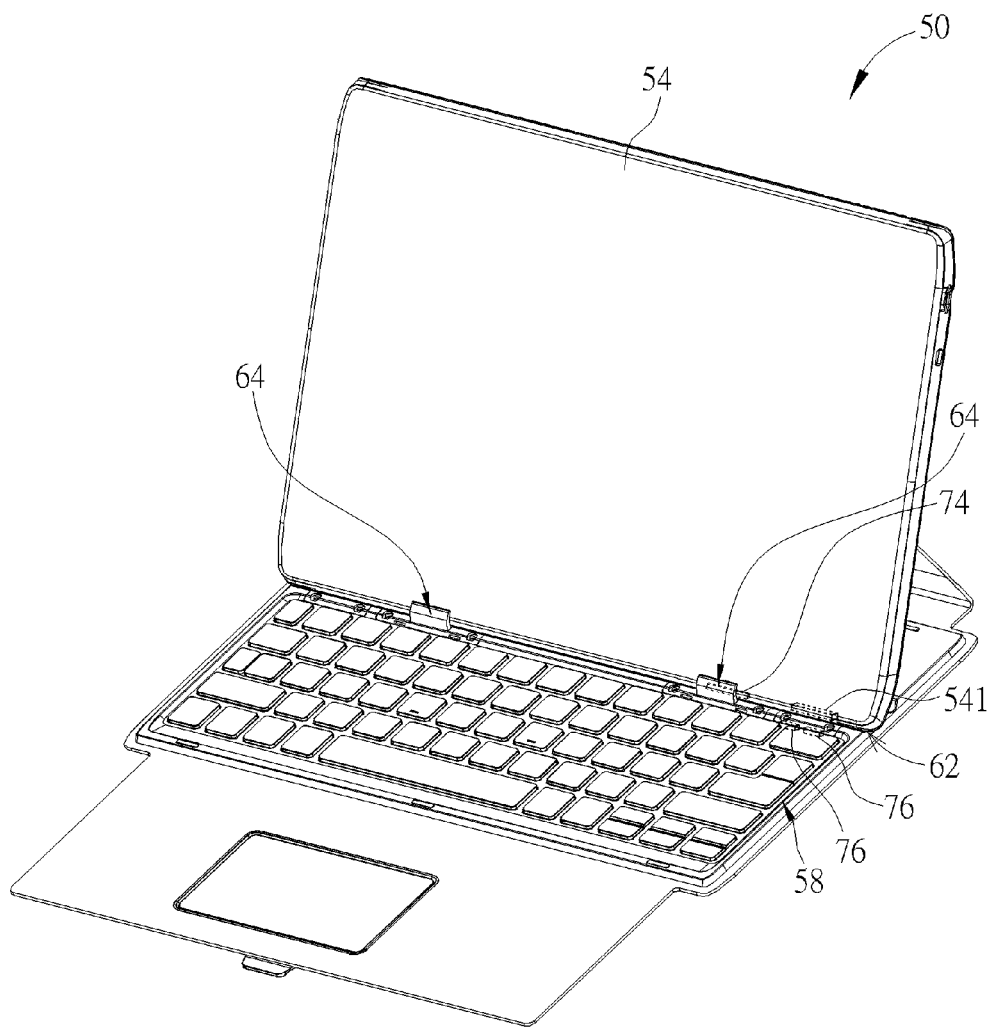

Please refer to FIG. 11. The plurality of the fixing structures includes two magnetic attraction components 76 and one rib structure 74 in this embodiment. The magnetic attraction components 76 attract the corresponding magnetic component 541 of the portable electronic device 54 as to fix the portable electronic device 54 with the rib structure 74. The number and the position of the magnetic attraction components 76, the rib structures 74 and magnetic components 541 are not limited to the above embodiment. It depends on the practical requirements. For example, two rib structures 74, four magnetic attraction components 76 and two corresponding magnetic components 541 can be disposed on the two sides of the end of the portable electronic device 54. In addition, as shown in FIG. 12, the plurality of fixing structures includes one rotary fixing unit 64 and one rib structure 74. The rib structure 74 is inserted into the end of the portable electronic device 54 for fixing the portable electronic device 54 on the base 58 with the rotary fix unit 64. As shown in FIG. 13, the plurality fixing structure includes one rib structure 74, two magnetic attraction components 76 and two rotary fixing units 64 in this embodiment. Two rotary fixing units 64 is for rotatably contacting against the end of the portable electronic device 54 for fixing the portable electronic device 54 with the two magnetic attraction components 76 and the rib structure 74. As a result, various fixing structures can be utilized to fix the portable electronic device 54 on the base 58 for enhancing the fixing effect.

In addition, please refer to FIG. 6. When the portable electronic device 54 is not used, the portable electronic device 54 and the second plate 523 can be pivoted relative to the first plate 521 to fold up the portable electronic device 54 with the base 58. As the rib structure 74 is designed to be a fixing structure, a height of the rib structure 74 can be less than a height of the at least one slot structure 62 so that the portable electronic device 54 does not contact the rib structure 74 when the portable electronic device 54 is folded with the base 58, so as to avoid the portable electronic device 54 from being scratched by the rib structure 74.

In contrast to the prior art, the plurality of fixing structures of the fixing device can fix the portable electronic device on the base stably in the present invention. The plurality of fixing structures can optionally include a rotary fixing unit, a magnetic attraction component and a rib structure. The three kinds of fixing structures can be utilized in different combinations according to the practical requirements, thus the portable electronic device can be fixed on the base stably by the plurality of fixing structures. It can solve a conventional problem that the tablet computer sways easily so that the tablet computer might be separated from the base to collide onto the floor or something else when the tablet computer is carried with the base because the tablet computer is fixed on the base only by the single slot in the prior art. In addition, the plurality of the slot structures can be disposed on the base, and the portable electronic device can be selectively inserted into one of the slot structures so as to adjust a using angle and a view angle of the portable electronic device to be ergonomically.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fixing device for fixing a portable electronic device, the fixing device comprising:
   a base whereon at least one slot structure is formed; and
   a plurality of fixing structures disposed on the base, the plurality of fixing structures being for fixing the portable electronic device on the base as an end of the portable electronic device is inserted into the at least one slot structure, the plurality of fixing structures comprising a rotary fixing unit for rotating against the end of the portable electronic device so as to fix the end of the portable electronic device inside the at least one slot structure, the rotating fixing unit comprising:
   a socket disposed on the base;
   a rotary plate pivoted to the socket; and
   a resilient component connected to the socket and the rotary plate, wherein the resilient component drives the rotary plate to rotate to a fixing position in a first rotating direction so that the rotary plate contacts against the end of the portable electronic device to fix the end of the portable electronic device inside the at least one slot structure as the portable electronic device is unfolded with respect to the base and inserted inside the at least one slot structure, and the portable electronic device drives the rotary plate to rotate to a position substantially parallel to the base in a second rotating direction opposite to the first rotating direction as the portable electronic device is folded with the base.

2. The fixing device of claim 1, wherein the plurality of fixing structures comprises a rib structure disposed on the at least one slot structure for inserting into the end of the portable electronic device so as to fix the portable electronic device with the rotary fixing unit.

3. The fixing device of claim 1, wherein a plurality of slot structures is formed on the base.

4. A portable electronic system comprising:
   a plate component comprising a first plate and a second plate rotatably connected to the first plate;
   a portable electronic device connected to the second plate of the plate component; and a fixing device for fixing the portable electronic device on the first plate, the fixing device comprising:
  a base disposed on the first plate of the plate component, at least one slot structure being formed on the base;
  a rotary fixing unit for rotating against an end of the portable electronic device; and
  a rib structure disposed on the at least one slot structure for inserting into the end of the portable electronic device so as to fix the portable electronic device on the base with the rotary fixing unit, wherein a height of the rib structure is less than a height of the at least one slot structure so that the portable electronic device does not contact the rib structure as the second plate and the portable electronic device is folded with the base and the first plate.

5. A fixing device for fixing a portable electronic device, the fixing device comprising:
  a base whereon at least one slot structure is formed; and
  a plurality of fixing structures disposed on the base, the plurality of fixing structures being for fixing the portable electronic device on the base as an end of the portable electronic device is inserted into the at least one slot structure, the plurality of fixing structures comprising:
    a magnetic attraction component disposed on the base for attracting a magnetic component of the portable electronic device so as to fix the end of the portable electronic device inside the at least one slot structure; and
    a rotating fixing unit being for rotating against the end of the portable electronic device so as to fix the portable electronic device with the magnetic attraction component.

6. The fixing device of claim 5, wherein a plurality of slot structures is formed on the base.

7. A fixing device for fixing a portable electronic device, the fixing device comprising:
  a base whereon at least one slot structure is formed; and
  a plurality of fixing structures disposed on the base, the plurality of fixing structures being for fixing the portable electronic device on the base as an end of the portable electronic device is inserted into the at least one slot structure, the plurality of fixing structures comprising:
    a rib structure disposed on the at least one slot structure for inserting into the end of the portable electronic device;
    a magnetic attraction component disposed on the base for attracting a magnetic component of the portable electronic device; and
    a rotary fixing unit for rotating against the end of the portable electronic device so as to fix the portable electronic device with the rib structure and the magnetic attraction component.

8. The fixing device of claim 7, wherein a plurality of slot structures is formed on the base.

9. A fixing device for fixing a portable electronic device, the fixing device comprising:
  a base whereon at least one slot structure is formed; and
  a plurality of fixing structures disposed on the base, the plurality of fixing structures being for fixing the portable electronic device on the base as an end of the portable electronic device is inserted into the at least one slot structure, the plurality of fixing structures comprising:
    a magnetic attraction component disposed on the base for attracting a magnetic component of the portable electronic device; and
    a rib structure disposed on the at least one slot structure for inserting into the end of the portable electronic device so as to fix the portable electronic device with the magnetic attraction component, wherein a height of the rib structure is less than a height of the at least one slot structure so that the portable electronic device does not contact the rib structure as the portable electronic device is folded with the base.

10. The fixing device of claim 9, wherein a plurality of slot structures is formed on the base.

* * * * *